US006771562B2

(12) United States Patent
Betts et al.

(10) Patent No.: US 6,771,562 B2
(45) Date of Patent: Aug. 3, 2004

(54) FISH FINDING METHOD AND SYSTEM

(75) Inventors: David A. Betts, Eufaula, AL (US); Christopher James Bennett, Eufaula, AL (US); Douglas W. Rasmussen, McKinney, TX (US)

(73) Assignee: Techsonic Industries, Inc., Eufaula, AL (US)

( * ) Notice: Subject to any disclaimer, the term of this patent is extended or adjusted under 35 U.S.C. 154(b) by 35 days.

(21) Appl. No.: 10/228,120

(22) Filed: Aug. 26, 2002

(65) Prior Publication Data

US 2004/0105343 A1 Jun. 3, 2004

Related U.S. Application Data

(63) Continuation-in-part of application No. 10/161,933, filed on Jun. 2, 2002.

(51) Int. Cl.⁷ .............................................. G01S 15/96
(52) U.S. Cl. ........................................................ 367/111
(58) Field of Search ............................ 367/95, 96, 98, 367/99, 111, 134, 910

(56) References Cited

U.S. PATENT DOCUMENTS

| | | | |
|---|---|---|---|
| D289,265 S | 4/1987 | Wood et al. ................. D10/46 |
| D296,767 S | 7/1988 | Wood et al. ................. D10/46 |
| 4,757,481 A | * 7/1988 | Orr et al. ...................... 367/96 |
| 4,829,493 A | 5/1989 | Bailey ......................... 367/111 |
| 4,873,676 A | 10/1989 | Bailey et al. ................. 367/98 |
| 4,901,291 A | * 2/1990 | Kurata ........................ 367/111 |
| 5,184,330 A | 2/1993 | Adams et al. ............... 367/111 |
| 5,230,646 A | 7/1993 | Thorup ........................ 441/131 |
| 5,253,220 A | 10/1993 | Wilson, Sr. ................. 367/107 |
| 5,463,597 A | 10/1995 | Harlev ........................ 367/107 |
| 5,495,689 A | 3/1996 | Cassem ....................... 43/17.1 |
| 5,546,695 A | 8/1996 | Langer ....................... 43/44.98 |
| D389,757 S | 1/1998 | Nishimura et al. .......... D10/65 |
| 5,887,376 A | 3/1999 | Currier et al. ................. 43/17 |
| D422,924 S | 4/2000 | Bendinelli ................... D10/65 |
| 6,122,852 A | 9/2000 | Mechling, IV .................. 43/4 |
| 6,222,449 B1 | 4/2001 | Twining ..................... 340/539 |
| D441,670 S | 5/2001 | Jackson et al. .............. D10/65 |

OTHER PUBLICATIONS

Outer Banks Outfitters Boater' World Marine Centers (1999 Master Gear Catalog), Atlantic Station, P.O. Box 3330, Atlantic Beach, NC 28512, cover, pp. 4, 5, 11–15, 17, 18, 20, 21, 23, 30–34, back cover.
Bass Pro Shops 2000 Master Catalog, Springfield, MO, Cover, p. 238–244.
Brochure, Zercom Marine, 1999, Techsonic Industries, a Division of Teleflex Inc.

* cited by examiner

*Primary Examiner*—Daniel T. Pihulic
(74) *Attorney, Agent, or Firm*—Baker, Donelson, Bearman, Caldwell & Berkowitz

(57) ABSTRACT

A buoy to shore fish finding system has a buoyant station with a sonar transmitter, a sonar receiver, a sonar to electric signal transducer and a radio transmitter all controlled by a microprocessor. The system shore station has a radio receiver and signal display controlled by a shore station microprocessor. The buoyant station microprocessor is programmed to generate sync pulses and to transmit both the sync pulses and transduced sonar echo returns to the shore station while the shore station microprocessor is programmed to display only echo signals received after a sync pulse. The shore station is detachably secured to the arm of the fisherman or to his fishing rod.

6 Claims, 12 Drawing Sheets

FISH FINDING METHOD AND SYSTEM

REFERENCE TO RELATED APPLICATION

This is a continuation-in-part of application Ser. No. 10/161,933 filed Jun. 2, 2002.

TECHNICAL FIELD

This invention relates generally to portable electronic fish finding methods and systems, and particularly to fish finding methods and systems useable by fishermen along shorelines and river banks.

BACKGROUND OF THE INVENTION

Sonar systems have long been used aboard water craft to detect shorelines, sea bottoms, sunken objects and marine life. More recently, sonar based fish finders have been devised for use by fishermen from a river bank or a shore. Exemplary of these are those shown and described in U.S. Pat. Nos. 5,463,597; 5,495,689; 5,546,695; 5,887,376 and 6,122,852. These typically consist of a float or buoy that supports a sonar. The float is tethered as to a fishing pole. A transmission line extends from the float to a display screen that is located beside the shore based fisherman. With this system a fisherman is able to see sonar returns from fish and the immediate bottom terrain received and relayed from the buoy while standing on the bank. The buoy may be located over his or her baited fish hook or even be on the fishing line itself.

Unfortunately fish finders of the just described type have not gained substantial commercial acceptance. One of the main limitations of tethered transducers on the market today is a relatively short length of cable which limits the cast distance. Among their other limitations have been problems associated with rapid electric power exhaustion, the display of false and intermittent echoes, and with interference with similar units being used by other fishermen in the same locale. That both electrical transmission and fishing lines have extended between the float and shore has also been a complicating factor, particularly so where reels are used where line interference can easily occur. Even without reels line interference easily occurs as line tension and slack conditions change during fishing maneuvers.

In addition, where sonar returns are displayed on a stand alone screen the fisherman must continuously shift his eyes back and forth between the screen and bobber or buoy. Typically the screen is located to one side or the other of the fisherman and fishing line. Thus the fisherman must constantly make mental transitions between the screen displayed scene and the actual fishing scene to locate the subsurface images with respect to the surface and bobber. It would thus be advantageous to bring the displayed and real scene images into better alignment to reduce this mental transition effort.

Accordingly it is seen that a need remains for a portable fish finder for use by shore based anglers that consumes minimal power, that displays more reliable returns, and which can be simply set to avoid interference with another angler using even an identical fish finder in close proximity. It is to the provision of such that this invention is primarily directed.

SUMMARY OF THE INVENTION

In a preferred form of the invention a method of searching for marine life comprises the steps of generating a stream of digital electric sync pulses of a selected pulse length. Sonar pulses are transmitted from a buoyant station in response to sync pulse. Sonar echoes are received at the buoyant station and electric echo signals generated in response thereto. The electric echo signals are radio transmitted to a radio receiver at a shore station where those echo signals are displayed that follow a sync pulse.

The search method is usable in conjunction with sport fishing wherein a fisherman grips a fishing rod while viewing sonar returns in his fishing area that are displayed on a screen detachably secured to his wrist or to his fishing rod.

In another preferred form of the invention a buoy to shore fish finding system comprises a buoyant station having a sonar transmitter, a sonar receiver, a sonar to electric signal transducer and a radio transmitter all controlled by a microprocessor. A shore station has a radio receiver and signal display controlled by a shore station microprocessor. The buoyant station microprocessor is programmed to generate sync pulses and to transmit both the sync pulses and transduced sonar echo returns to the shore station. The shore station microprocessor is programmed to display only those echo signals received after a sync pulse.

BRIEF DESCRIPTION OF THE DRAWING

FIG. 2A is a block diagram of the, buoyant-based or sonar remote subassembly while

DETAILED DESCRIPTION

Figure 1:
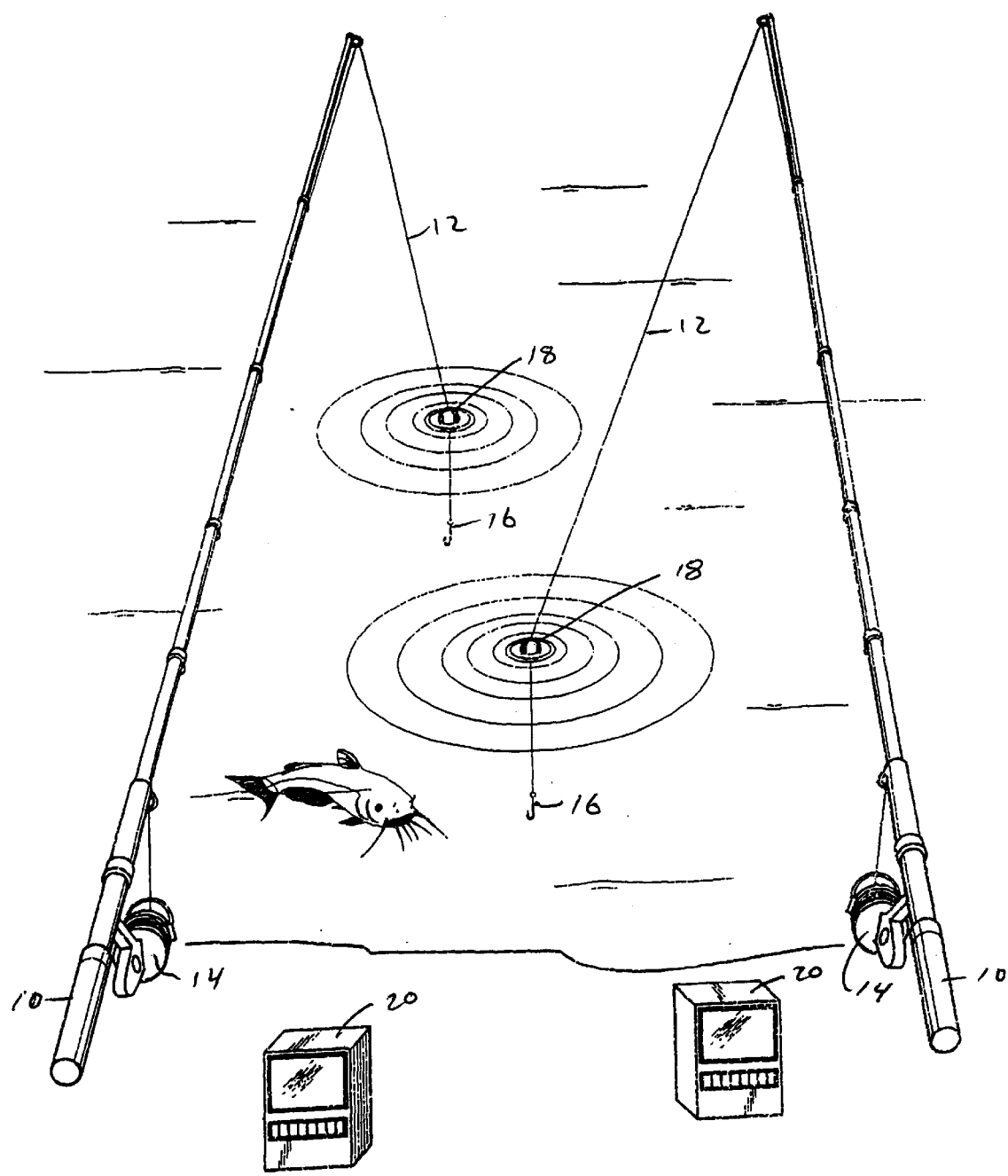
FIG. 1 is a pictorial representation of two fish finders of the present invention being used together simultaneously side by side without significant interference.

Referring now in more detail to the drawing, there is shown in FIG. 1 two fishing poles 10 being used by two fishermen in close proximity. Each has a fishing line 12 that extends from a reel 14 to a fish hook 16 which here is shown unbaited, for clarity. A buoy or bobber 18 is secured to each line above the hook. In this case, the buoy 18 houses the buoyant station electronic equipment that is described later in detail. However, the buoyant station for this equipment could alternatively be independent of the fish hook and line. A shore station display 20 is shown next to each fishing pole 10 which could be a modified version of a Piranha 4 portable fishfinder sold by Techsonic Industries of Eufaula, Ala.

Figure 2A:
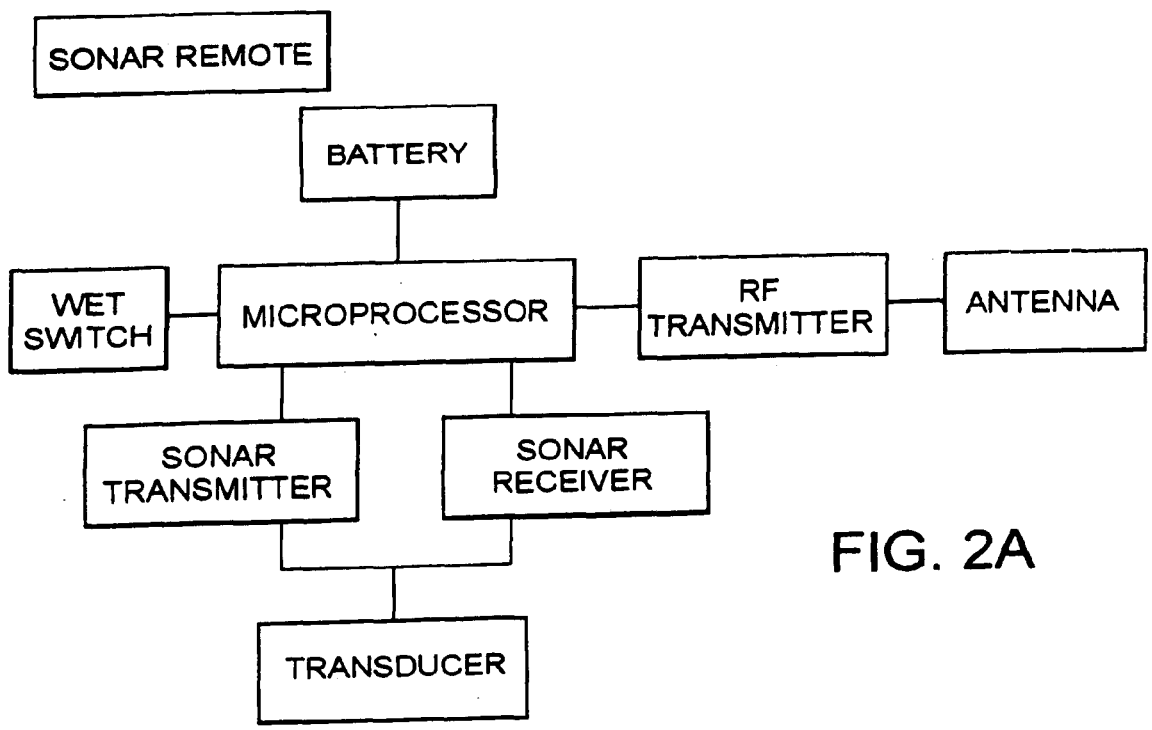

The buoyant station houses within a buoy the sonar remote subsystem shown generally in FIG. 2A. This includes a battery powered microprocessor that controls a sonar transmitter and which processes sonar echoes from a transducer. It also controls an RF transmitter that emits signals from an antenna. The buoyant station also has a battery and a wet switch.

Figure 4:
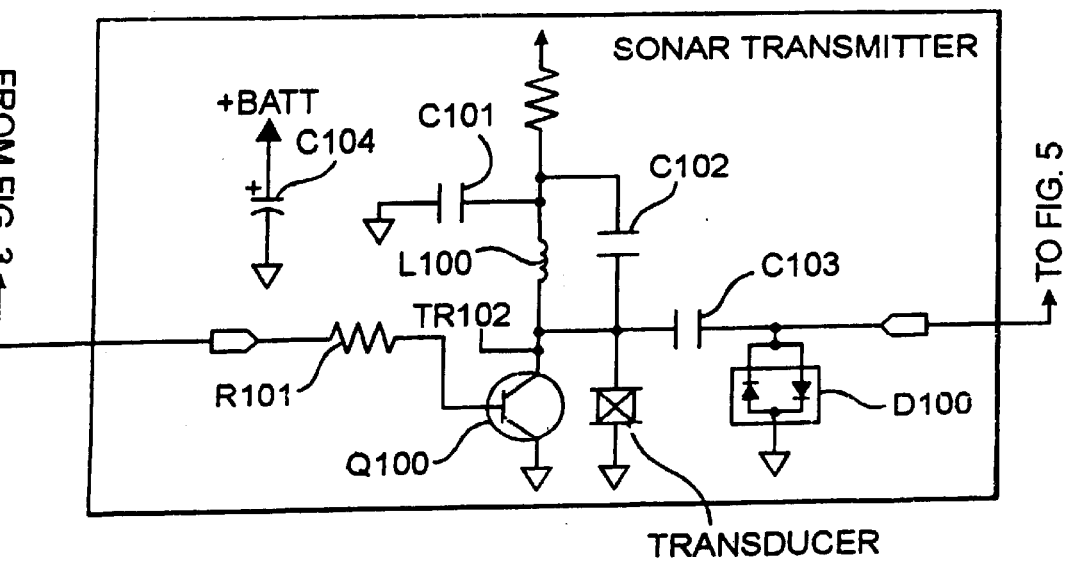
FIG. 4 is a more detailed diagram of the sonar transmitter circuit.

The sonar transmitter is seen in FIG. 4 to have a sonar transmit transistor Q100 that boost 3 volt battery power through an inductive/capacitive tuned circuit L100/C102 to a transmit voltage of about 25 volts peak to peak across the transducer. The transducer converts the voltage into a sound pressure pulse in the water. Echoes may in turn be received by the transducer which converts their pressure waves back to voltages.

Figure 5:
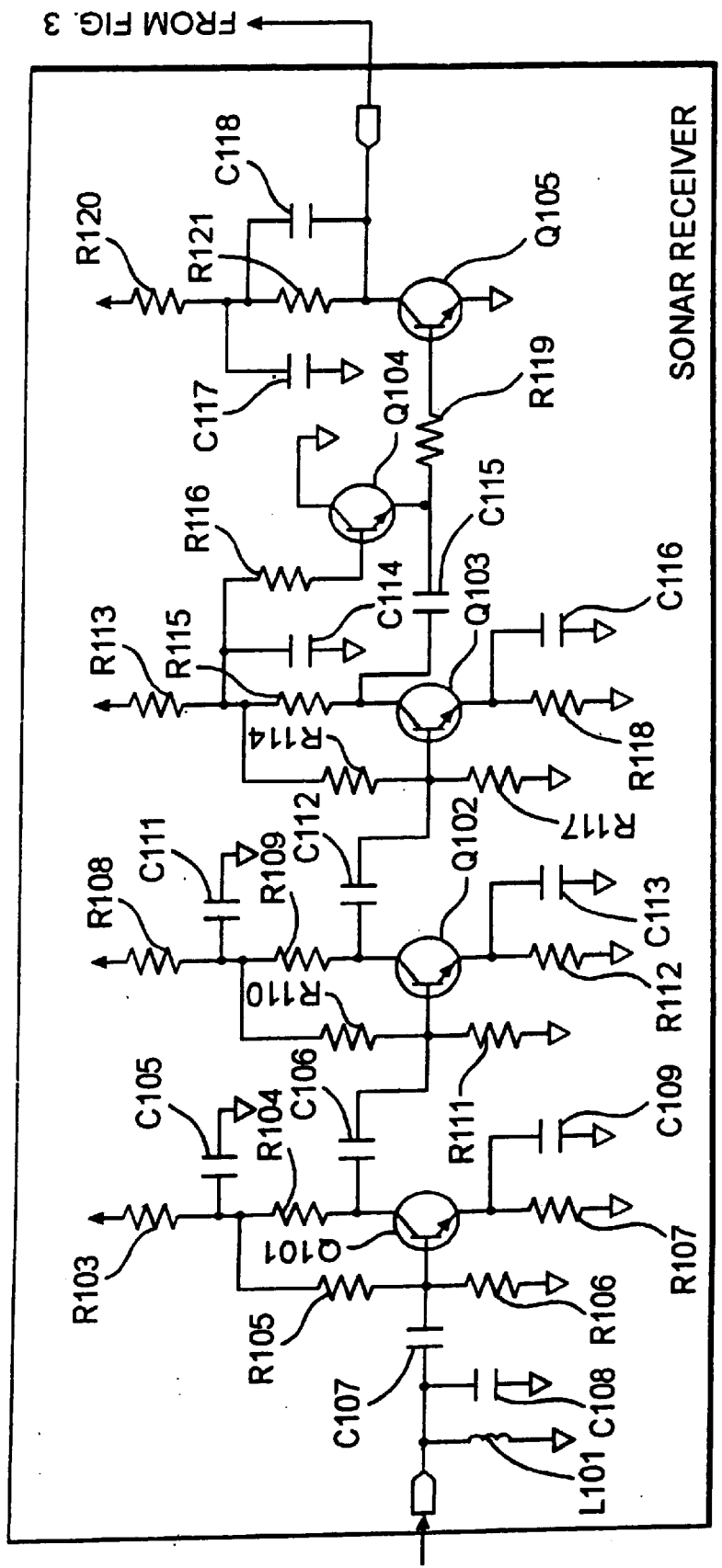
FIG. 5 is a circuit diagram of the sonar receiver.

As shown in FIG. 5 the sonar receiver is powered through resistive-capacitor decoupling networks (R103/C105, R108/C111) that provides a time variable gain function (TVG) for the receiver, that gradually increases the gain with time so that close-in returns have the same size as returns that are more distant. The receiver is a three stage, common emitter, universal bias transistor amplifier (Q101, Q102, Q103). Each stage has a little more than 30 db of gain providing an overall gain of more than 90 db. The resistor bias is chosen for proper impedance matching and low current consumption. The emitter bypass capacitors C109, C113, C116 and the interstage coupling capacitors C107, C106, C112, C115 are chosen to provide additional high pass filtering.

An LC filter L101, C108 provides for bandpass filtering at the input to the receiver section. The filtered ac coupled signal is rectified and demodulated by transistor Q104 and threshold detected by transistor Q105 to a logic level signal that coincides with the width of each received sonar echo. This logic level is input to pin 4 (DETECTOR) so that the microprocessor outputs an RF pulse equal in width to each sonar return on pin 7 (RF_XMITTER).

Figure 6:
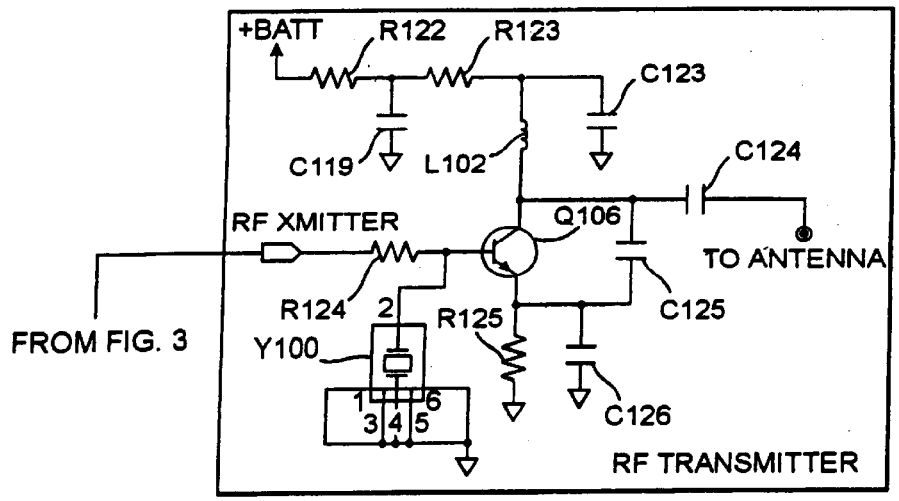
FIG. 6 is a circuit diagram of the RF transmitter.
Figure 7:
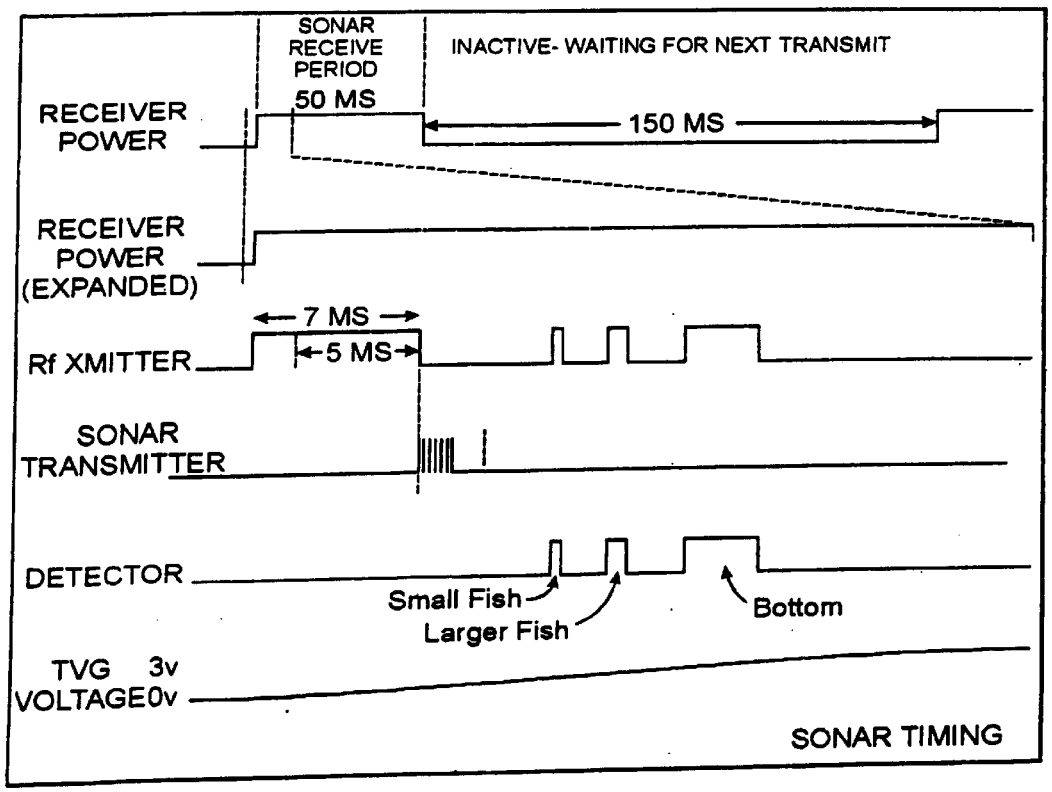
FIG. 7 shows a set of pulse trains that depict power cycles, sync pulses and sonar pulses and return.

The RF transmitter is shown in FIG. 6. It has a transistor Q106 Colpitts oscillator whose frequency is determined by combination of a surface acoustic wave (SAW) resonator along with L102, C125 and C126. This configuration enables low current consumption as no power is used when the transmitter is not enabled.

Figure 2B:
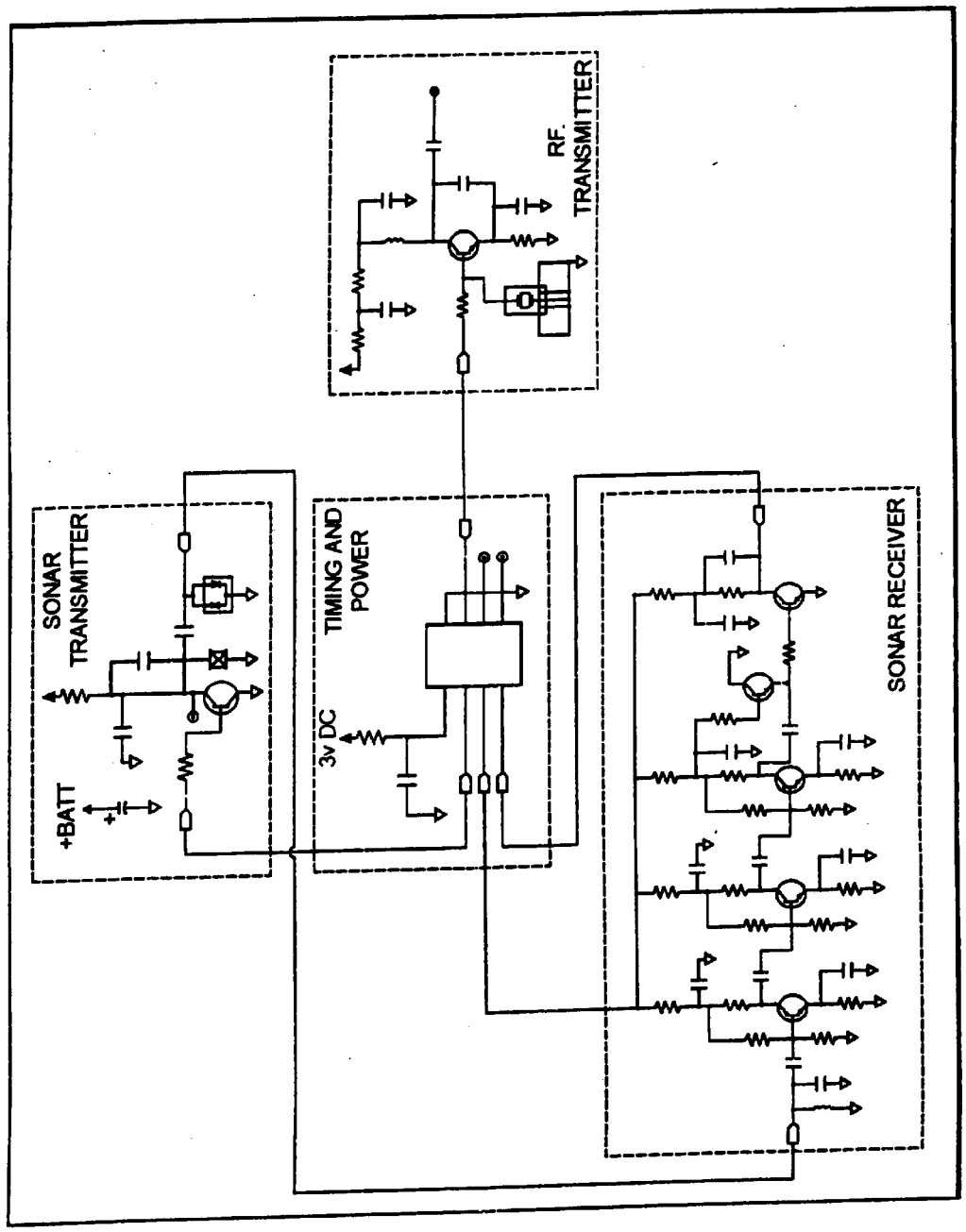
FIG. 2B is a circuit diagram of its sonar transmitter and receiver, its timing and control section and its RF transmitter.
Figure 3:
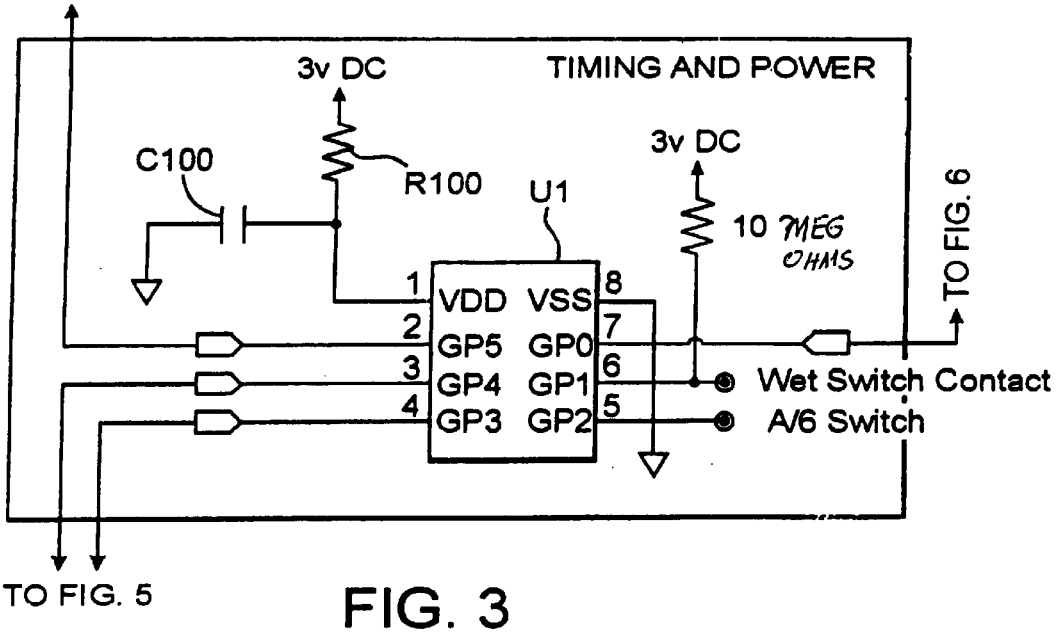
FIG. 3 is a more detailed diagram of the timing and power circuit.

As shown in FIGS. 2B and FIG. 3 the sonar transmitter and receiver and the RF transmitter are controlled by a timing and power circuit. This circuit has a PIC 12C508A type microprocessor UI that provides for power and timer controller for the Sonar Remote in the buoy. The wet switch consists of two closely spaced brass contacts that are submerged when the buoy is in water. One contact is connected to system ground and the other is connected to pin 6 (H20)_SW which is pulled high by a 10 meg ohm resistor. As long as the wet switch remains dry the microprocessor remains in sleep mode drawing less than 1 microamp of current from the CR2032, 3 volt lithium battery. When the wet switch is activated by placing as by casting the buoy into water, pin 6 (H20_SW) is pulled low by the conductivity of the water and the microprocessor comes out of its sleep mode. After a few programmed instructions of initialization, the microprocessor brings pin 3 (REC PWR) high which provides power to the receiver portion of the circuitry. The microprocessor enables a sonar receive period of about 50 milliseconds which translates to a range of about 120 feet. After the sonar receive period, the microprocessor takes pin 3 (REC PWR) low, turning off the receiver, and reducing current consumption. The microprocessor waits about 150 milliseconds before it initiates another sync pulse and sonar transmit-receive cycle. The sonar remote therefore has about a 5 pulse per second update rate. This operation continues until the sonar remote is removed from the water and the wet switch becomes dry causing the microprocessor to go back into its sleep mode.

The microprocessor also controls the A/B channel timing so that two sonar remotes can be used in close proximity to each other with minimal interference. If pin 5 (A/B SW) is tied high, then the sonar remote is in the A channel configuration that uses a 7 millisecond sync pulse length. If the pin is tied low, then the B channel is selected and a 5 millisecond sync pulse is used for receiver synchronization. The A channel is selected then a few microseconds after the REC PWR point goes high, the RF XMITTER pin goes high and enables the RF transmitter to transmit a 7 millisecond RF synchronization burst. After the RF sync burst the microprocessor generates a twenty cycle, 120 khz sonar tone burst on pin 2 (S XMIT). Alternatively channel selection may be made by a manual switch. Of course more than two channels may be provided, if desired.

Figure 8:
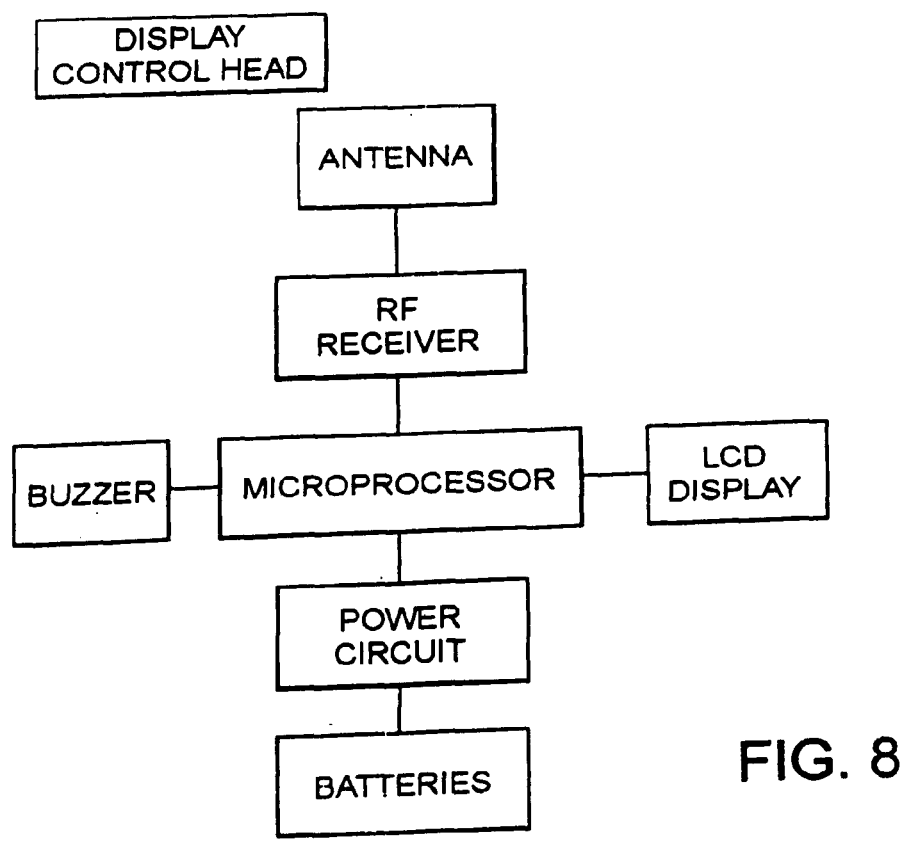
FIG. 8 is a block diagram of the shore-based display control head subassembly.

As shown in FIG. 8 the portable shore station 20 also has its own microprocessor that processes radio signals received by its station RF receiver. It is a super-regenerative receiver with RF preamplifier for increased sensitivity and reduces broadband interference that is inherent with super regenerative type receivers. The receiver amplifies and demodulates signals sent from the buoy station which contain the base-banded envelope of the sync pulses and echo returns. Alternatively, a super heterodyne receiver can be used.

The display control head microprocessor at the shore station 20 implements its programmed algorithms that detect a designated sync pulse. It filters the signals, sorts sonar target returns from the bottom and fish, calculates display range parameters and then feeds the processed signals to the LCD display screen. The display is preferably a graphic display, for example, but not limited on the order of 64 by 128 pixels or other pixel orders. Others such as LED, Flasher, A-scope and digital segment may alternatively be used. Finally the shore station, which is housed in the same unit that has the display screen, is powered by replaceable AA batteries. Its user interface has switches or push buttons that allow for user inputs through a display menu where parameters like depth range, sensitivity, fish alarm may be set. These features and circuits are conventional to existing Piranha finders as well as others.

A representative set of operative values for discrete components of the circuits is set forth in Table 1.

TABLE 1

| Resistors (ohms) | | | Capacitors (microfarads) | | |
|---|---|---|---|---|---|
| R100 | 10 | K | C100 | 0.1 | U |
| R101 | 3.3 | K | C101 | 0.1 | U |
| R102 | 10 | | C102 | 2700 | P |
| R103 | 1 | K | C103 | 1000 | P |
| R104 | 10 | K | C104 | 100 | U |
| R105 | 300 | K | C106 | 1000 | P |
| R106 | 220 | K | C107 | .01 | U |
| R107 | 4.53 | K | C108 | 2700 | P |
| R108 | 1 | K | C109 | .01 | U |
| R109 | 10 | K | C111 | 0.1 | U |
| R110 | 300 | K | C112 | 1000 | P |
| R111 | 220 | K | C113 | .01 | U |
| R112 | 4.53 | K | C114 | .1 | U |
| R113 | 1 | K | C115 | 1000 | P |
| R114 | 300 | K | C116 | .01 | U |
| R115 | 10 | K | C117 | .1 | U |
| R116 | 100 | K | C118 | 1000 | P |
| R117 | 220 | K | C119 | 4.7 | U |
| R118 | 4.53 | K | C123 | 100 | P |

TABLE 1-continued

| Resistors (ohms) | | | Capacitors (microfarads) | | |
|---|---|---|---|---|---|
| R119 | 10 | K | C124 | 1 | P |
| R120 | 1 | K | C125 | 2.2 | P |
| R121 | 100 | K | C126 | 10 | P |
| R122 | 100 | | | | |
| R123 | 47 | | | | |
| R124 | 100 | K | | | |
| R125 | 220 | | | | |

The first algorithm performed by the control head is sync detector. It tests the incoming signal for a high period that falls within the acceptable limits of an A or B channel selected from the user menu. If a sync pulse is not detected, no updates are made to the LCD display. Once a proper sync pulse is detected, the falling edge of the sync signal indicates when the sonar transmission was initiated and becomes the time zero for determining the depth of the echo targets. The next algorithm performed is data collection. Incoming echo signals are sampled at a high rate (~20,000 times a second) and the samples are processed in real time for the start, end, and width of targets. The X (5) largest targets are sorted and saved. If too many returns are detected (>10), then it is assumed that noise is present and the display is not updated for that transit receive cycle. The targets are then processed by a N of M (2 of 3) filter that requires that the targets are present for N (2) times out of the last M (3) returns. This helps reduce interference from other noise sources as well as data from sonar remotes of the other channel. The targets are then sorted to determine which one is the bottom (usually the longest) which ones represent fish and structures. After the bottom is initially found other bottom tracking algorithms are used to hold onto the bottom. Depth of the bottom or target is determined by the time elapsed from the end of the sync pulse to the start of the target. One millisecond equates to a round trip of about 2.4 feet based on the speed of sound in water of 4800 feet per second. These targets are then displayed on the LCD display.

Figure 9:
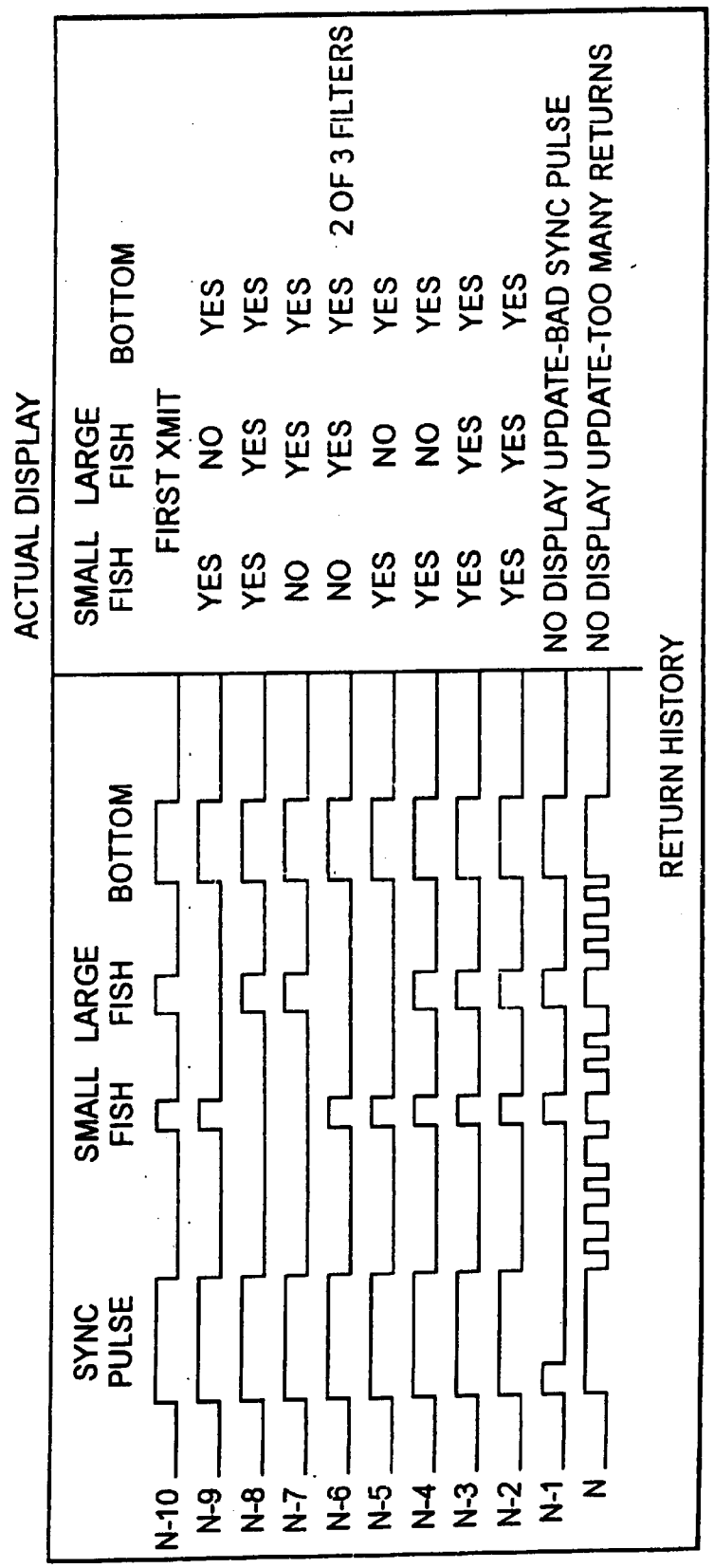
FIG. 9 is a table of target returns as actually displayed at the shore-based station.

The 2 out of 3 filter is effective to screen out unreliable and transient returns as shown in FIG. 9. Here it is seen that unrealistically excessive number of echo returns are excluded as are those that follow an erroneous sync pulse. Echo signals that do follow a sync pulse of the selected length (A or B channel) are displayed but only if they have been received 2 out of the last 3 times following the last succession of 3 sync pulses. This serves to enhance the reliability of displayed target information and to exclude signal anomalies. By displaying only those targets that have been received after sync pulses of preselected pulse length, not all targets are displayed. In this manner even two or more fish finders of the same construction may be used in close proximity without interference by mere selection of different channels. Again, this may be done by menu selection or by manual switch. Though pulse length is the preferred form of establishing and recognizing sync pulses. It should be understood that other waveform parameters could be used such as pulse strength and/or set signals sets of pulses.

The shore station and control head display 20 need not be in a stand-alone housing as shown in FIG. 1. It may instead be worn on the wrist much as a wrist watch is worn. Thus "wrist" here is actually meant to be the forearm just above the wrist but is referred to as "wrist" for convention.

Figure 10A:
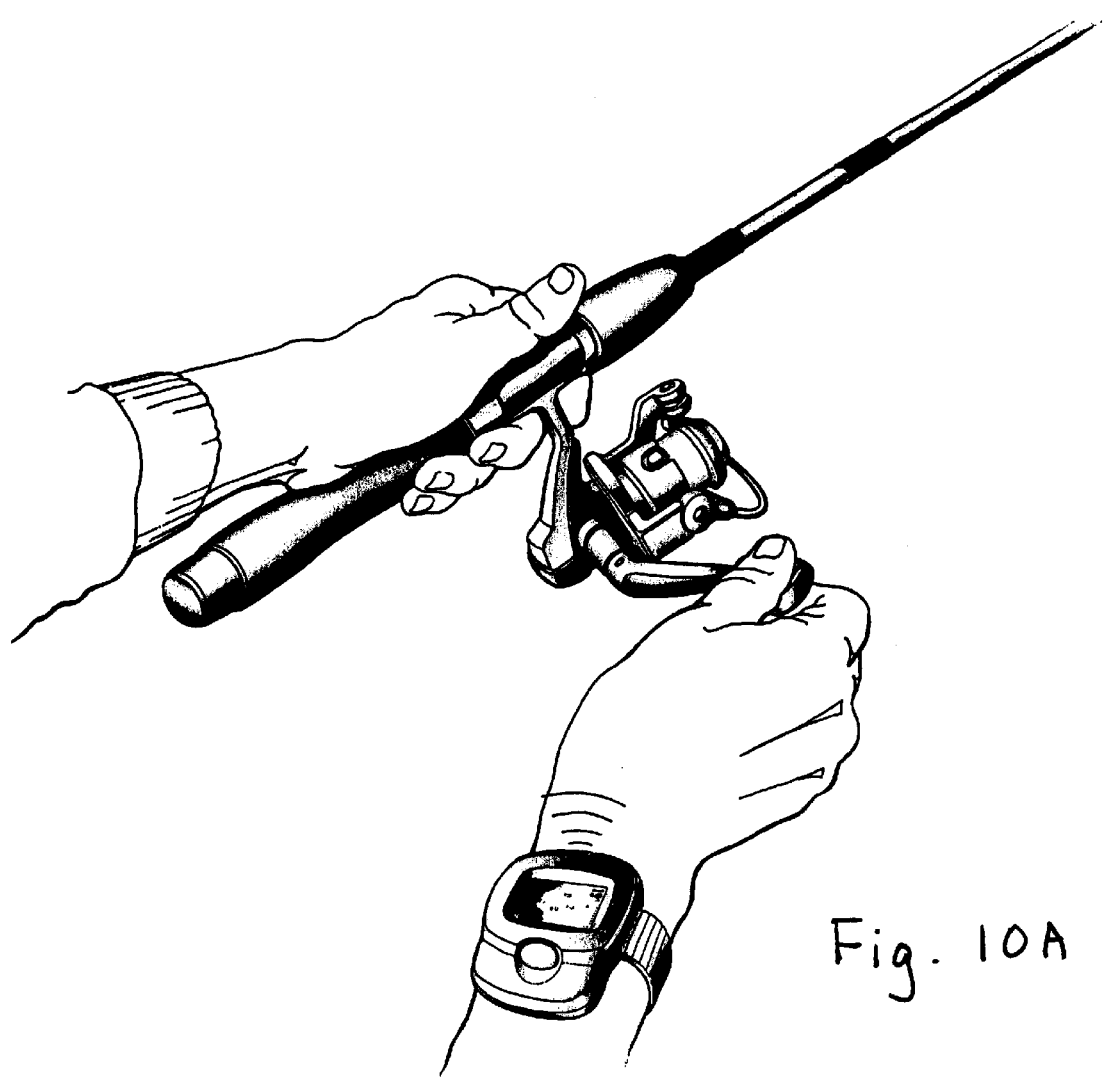
FIGS. 10A–10C show the shore station display control head mounted to a fisherman's wrist in three different orientations as the wrist and hand operate a fishing rod and reel.

FIG. 10A shows the shore station in a small housing releasibly secured to the inside of the right arm wrist by a wrist band. In this orientation the display screen is facing the head and eyes of the fisherman as he simultaneously manipulates the reel handle with his or her right hand. Note that as the reel is rotated the display screen maintains its orientation for good viewing. This is true both for spinning reels as well as for the older casting type reels. The screen itself in the illustrated embodiment is oriented to display the deepest images inwardly of the wrist. In other embodiments, the screen is oriented to display the deepest images proximally the elbow.

Figure 10B:
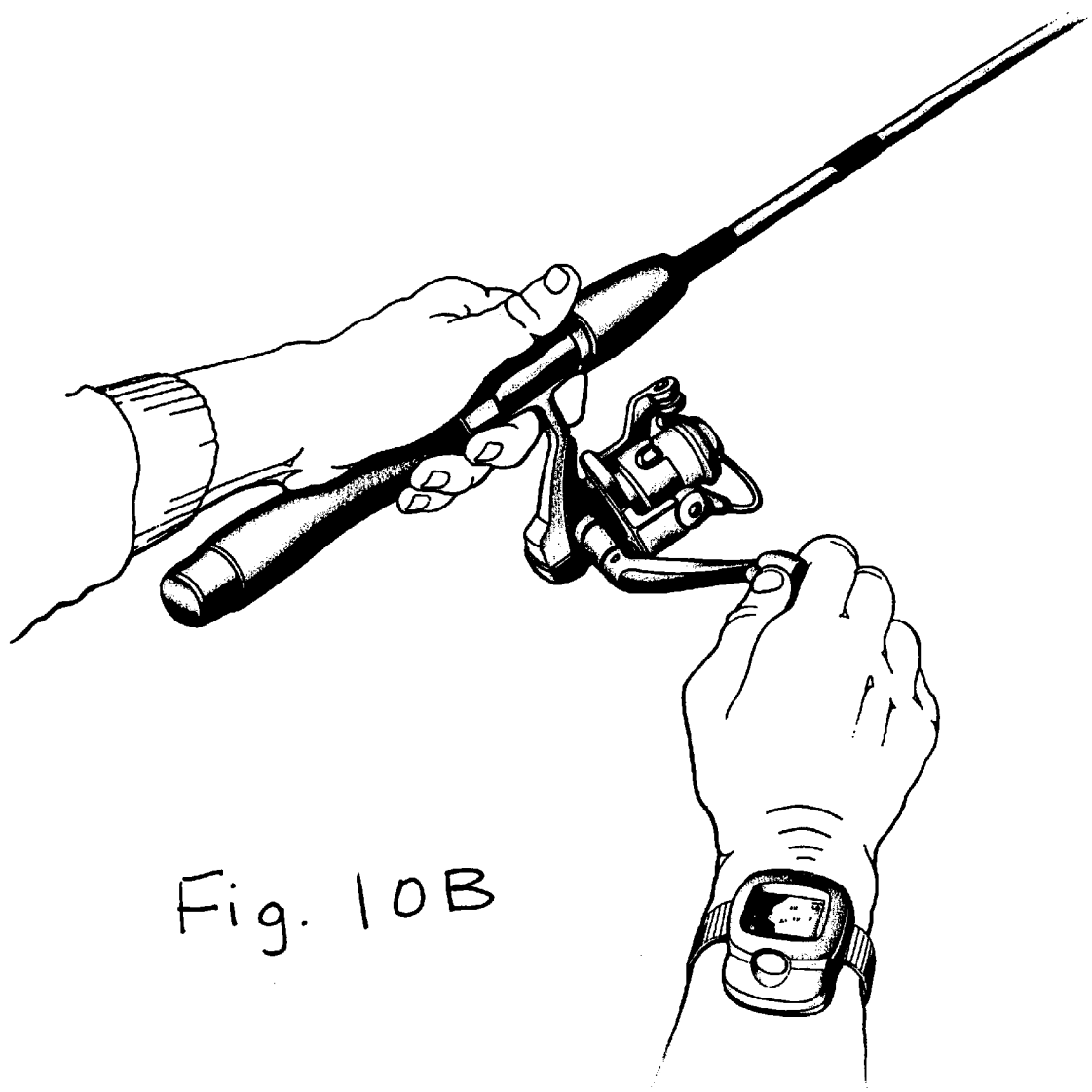
Figure 10C:
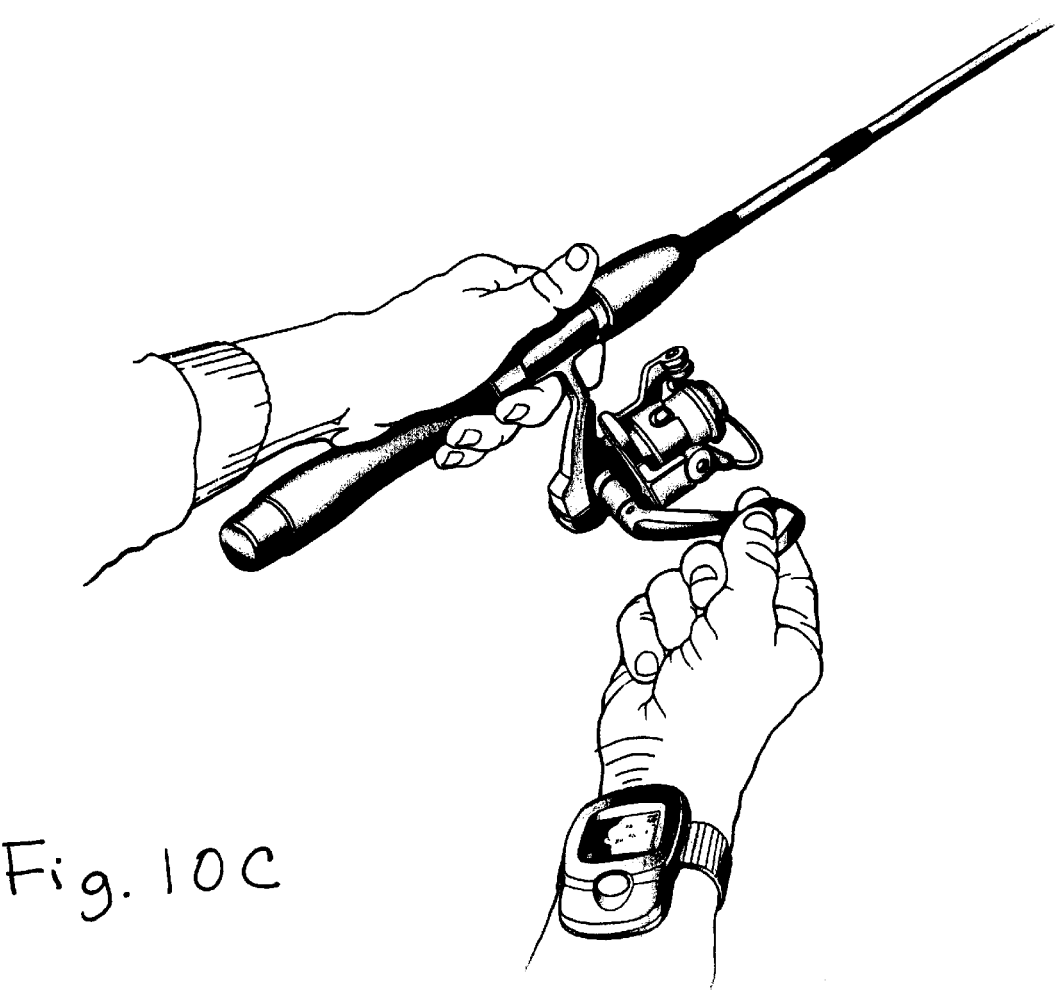
Figure 10D:
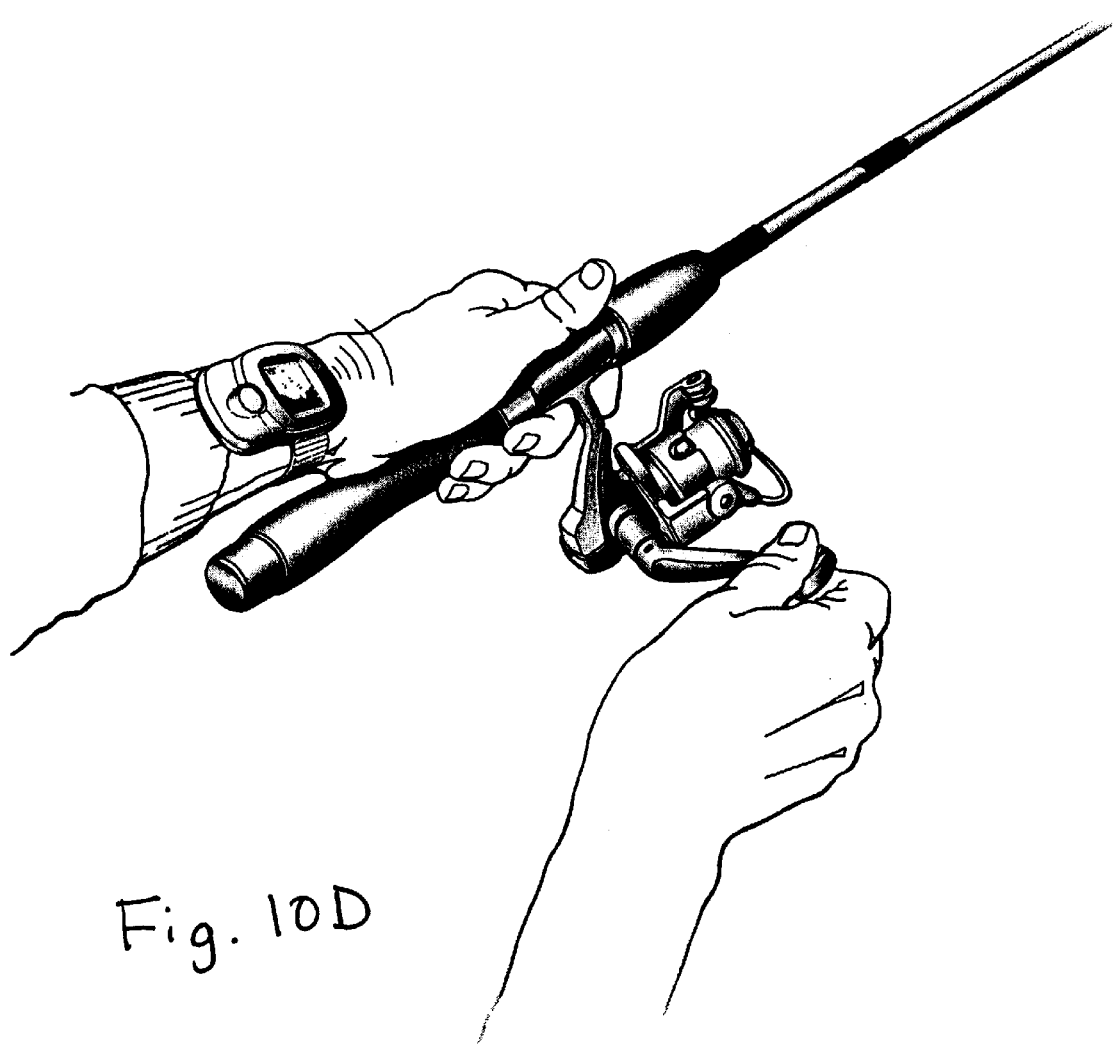

Some fishermen prefer to grip the reel handle differently. This may simply be personal preference or dependant on the weight of the tackle and size of the targeted fish. Thus FIG. 10B shows the control head and display mounted on the back of the wrist while FIG. 10C shows it mounted on the wrist underside. In each case the display maintains a proper orientation for the fisherman's eyes as the reel is held or manipulated. FIG. 10D shows the control head and display mounted on the left wrist with the rod held by the left hand. In this case the display would normally be mounted on the back of the wrist, as shown here, or on the inside of the wrist.

If desired the housing and wrist band may be color coded to differentiate station channels where fishermen are fishing together in close proximity. In that case the color of the buoyant station preferably bear a matching color.

Figure 11:
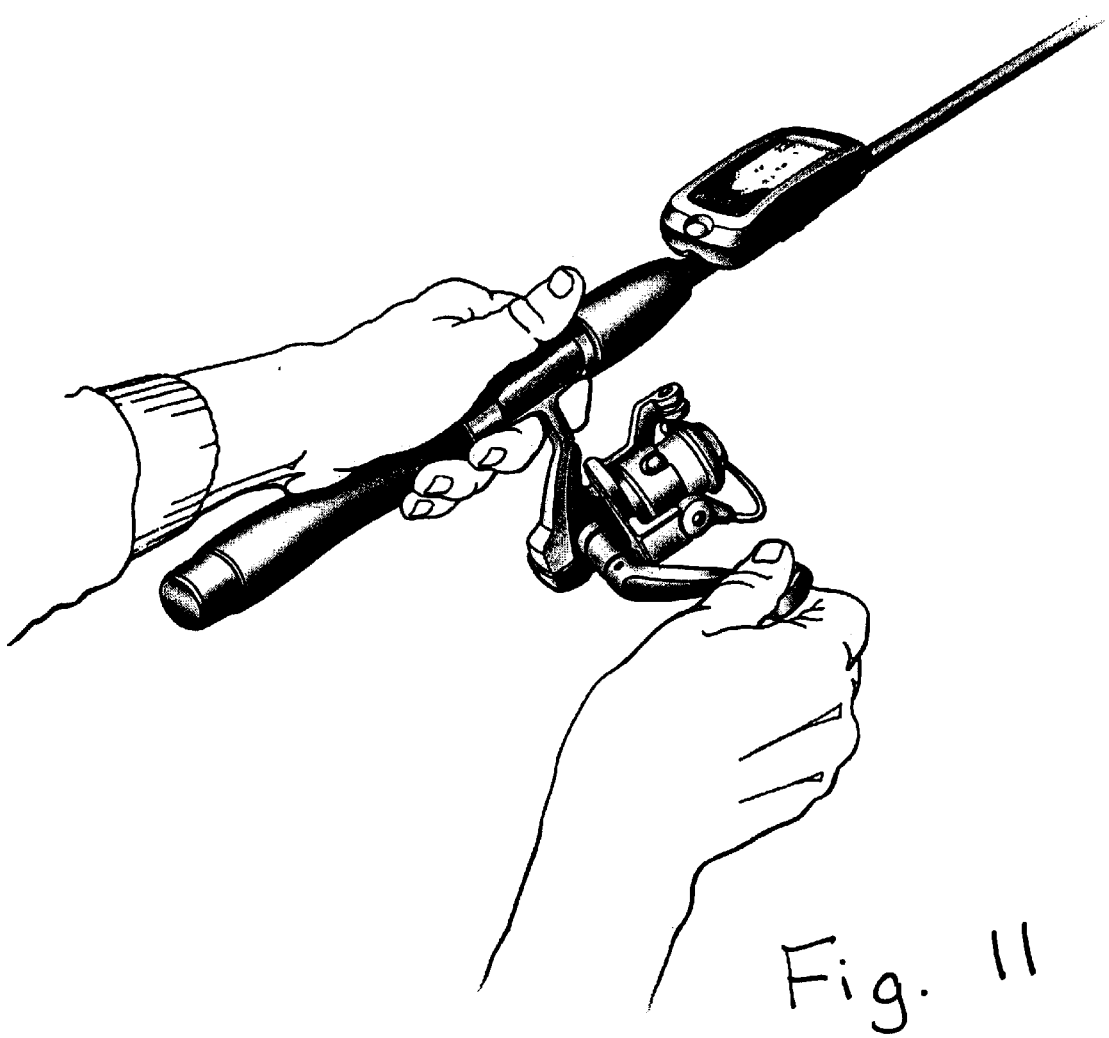
FIG. 11 shows the shore station display control head mounted to the rod itself of the rod and reel shown in FIGS. 10A–10C all while the reel is being manipulated.

As shown in FIG. 11 the control head and display is shown mounted on the rod itself. Here it is shown mounted on the top of the rod forward of the reel and reel mount. Preferably it is releasibly mounted such as with Velcro so that both the control head and reel may be easily mounted and dismounted from the rod.

Though the invention has been described in its preferred forms, it should be understood that many additions, modifications or deletions may be made without departure from the spirit and scope of the invention as set forth in the following claims. It should also be appreciated that the term shore station does not necessarily mean only a beach, sandbar, riverbank or other location on sand or soil but includes any other location spaced from the buoy station where a fisherman may choose to fish from such as a dock, pier, bridge or boat.

What is claimed is:

1. A method of fishing which comprises the steps of:
    (a) generating a stream of digital electric sync pulses;
    (b) transmitting sonar pulses from a buoyant station in response to sync pulses;
    (c) detecting sonar echoes at the buoyant station and generating electric echo signals in response thereto distinguishable from the sync pulses;
    (d) transmitting the electric echo signals to a radio receiver secured to the wrist of the fisherman; and
    (e) displaying echo signals which follow a sync pulse generated in real time on a screen detachably secured to the wrist of the fisherman.

2. The method of claim 1 wherein the digital electric sync pulses are generated of a preselected waveform, and wherein the electric echo signals are generated in waveforms different from that of the preselected sync pulses waveform.

3. A method of fishing with a fishing rod which comprises the steps of:
    (a) generating a stream of digital electric sync pulses of a preselected waveform;
    (b) transmitting sonar pulses from a buoyant station in response to sync pulses;
    (c) detecting sonar echoes at the buoyant station and generating electric echo signals in response thereto of waveforms different from the preselected sync pulse waveform;

(d) displaying echo signals which follow a sync pulse generated in real time on a screen secured to the fishing rod.

4. The method of claim 3 wherein the sync pulses are generated of a preselected pulse length, and wherein the electric echo signals are generated with pulse lengths less than that of the sync pulses.

5. A buoy to shore fish finding system comprising a buoyant station having a sonar transmitter, a sonar receiver a sonar to electric signal transducer and a radio transmitter all controlled by a microprocessor programmed to generate sync pulses and to transmit both the sync pulses and transduced sonar echo returns to a shore station having a radio receiver and signal display controlled by a shore station microprocessor that bears means for releasibly securing the shore station to an arm of a fisherman and wherein the shore station microprocessor is programmed to display only echo signals received after a sync pulse.

6. A buoy to shore fish finding system comprising a buoyant station having a sonar transmitter, a sonar receiver, a sonar to electric signal transducer and a radio transmitter all controlled by a microprocessor programmed to generate sync pulses and to transmit both the sync pulses and transduced sonar echo returns to the shore station; a shore station having a radio receiver and signal display controlled by a shore station microprocessor programmed to display only echo signals received after a sync pulse that is mounted in a housing that bears means for releasibly securing the shore station to a fishing rod.

* * * * *